United States Patent [19]

Aufdermarsh

[11] 4,394,489
[45] Jul. 19, 1983

[54] FLUOROELASTOMER CURATIVES

[75] Inventor: Carl A. Aufdermarsh, Newark, Del.

[73] Assignee: E. I. Du Pont de Nemours & Co., Wilmington, Del.

[21] Appl. No.: 352,328

[22] Filed: Feb. 25, 1982

[51] Int. Cl.³ ............................................. C08F 4/72
[52] U.S. Cl. .................................. 525/370; 525/326.3
[58] Field of Search ............................. 525/370, 326.3

[56] References Cited

U.S. PATENT DOCUMENTS

| 3,470,176 | 9/1969 | Zollinger | 260/248 |
| 3,546,186 | 12/1970 | Gladding et al. | 260/80.73 |
| 3,933,767 | 1/1976 | Nottke | 260/80.76 |
| 4,281,092 | 7/1981 | Breazeale | 526/247 |

Primary Examiner—Joseph L. Schofer
Assistant Examiner—Bernard Lipman

[57] ABSTRACT

Allyl-, propargyl- and allenyl- tin curatives for fluoroelastomers with nitrile cure sites provide rapid curing combined with excellent stability in aqueous environments.

7 Claims, No Drawings

FLUOROELASTOMER CURATIVES

BACKGROUND OF THE INVENTION

Perfluoroelastomers, providing, as they do, excellent physical properties and resistance to environmental attack, are widely used in applications where extraordinary resistance to heat and corrosive fluids is required. Elastomers of this type that contain a reactive nitrile cure site can be cured or vulcanized with a curative that joins the nitrile cure sites into a triazine. A wide variety of curatives or accelerators has been suggested in the past, of which tetraphenyltin has been found to be especially satisfactory. However, continuing effort has been directed toward the development of new curing agents which provide more rapid and complete vulcanization at low and moderate temperatures and which result in a cured product exhibiting resistance to the broadest possible range of environments.

SUMMARY OF THE INVENTION

The instant invention provides perfluoroelastomer compositions containing a curing agent which provides rapid and more complete vulcanization and which results in a final product that is particularly resistant to aqueous environments.

Specifically, the instant invention provides, in a nitrile-substituted fluoroelastomer containing a curing agent, the improvement wherein the curing agent comprises about from 1 to 10 parts per 100 parts by weight of elastomer of an organotin compound of the general formula $R_xSnY_{4-x}$ wherein x is 0-3, R is aryl of 6-10 carbon atoms or alkyl of 1-4 carbon atoms, and Y is at least one of allyl, propargyl and allenyl.

DETAILED DESCRIPTION OF THE INVENTION

The instant invention is applicable to fluoroelastomers containing nitrile cure sites. Such elastomeric compositions can be prepared, for example, by copolymerizing tetrafluoroethylene, perfluoromethylvinyl ether, and a third monomer containing a nitrile cure site. Other fluoroelastomers which can be used are those prepared from combinations of vinylidene fluoride, hexafluoropropylene, and tetrafluoroethylene and a monomer containing a nitrile cure site. The preparation of specific fluoroelastomers of this type is described in detail in Gladding et al. U.S. Pat. No. 3,546,186; Nottke U.S. Pat. No. 3,933,767 and Breazeale U.S. Pat. No. 4,281,092, all of which are hereby incorporated by reference. Those nitrile-substituted fluoroelastomers prepared from tetrafluoroethylene, perfluoromethyl perfluorovinyl ether and cyano-substituted perfluorovinyl ether described in U.S. Pat. No. 4,281,092, as well as copolymers of hexafluoropropylene oxide with nitrile-substituted perfluoroalkylene oxides have been found to be particularly satisfactory in combination with the curing agents of the present invention. The preparation of polyhexafluoro propylene oxide and its copolymers is described in the copending application of A. P. King and C. G. Krespan, U.S. Ser. No. 250,906, filed Apr. 3, 1981, hereby incorporated by reference.

The curing agents used in the present invention are organotin compounds of the general formula $R_xSnY_{4-x}$, wherein x is an integer of from 0-3, providing at least one Y substituent in the tin compound, and wherein Y is at least one of allyl ($-CH_2CH=CH_2$), propargyl ($-CH_2C\equiv CH$), and allenyl ($-CH=C=CH_2$). The remaining organic moieties, represented by R, can be aryl or alkyl moieties. Aryl substituents which can be used include those having 6-10 carbon atoms such as phenyl, toluyl and substituted phenyl moieties. Alkyl R groups which can be used include those having from 1-4 carbon atoms such as methyl, ethyl, propyl and butyl. While the behavior of any curing agent of the present invention will vary with the particular organic substituents, in general, the curing rate of the polymer will increase with the number of allyl, propargyl or allenyl groups present.

The amount of curing agent used will necessarily depend on the degree of crosslinking desired in the final product as well as the number of nitrile cure sites present in the fluoroelastomer. A marked molar excess of curing agent over the nitrile cure sites available in the fluoroelastomer may somewhat increase the curing rate, but will have little effect on the final properties of the cured polymer. In general, about from 1-10 parts by weight per one hundred parts of elastomer can be used, and about from 3-5 parts of curing agent per 100 parts of elastomer have been found to be particularly satisfactory for most applications.

The organotin curing agents used in the present invention can be prepared according to known techniques, as described, for example, in D. Seyferth and M. A. Weiner, *J. Org. Chem.* 26 pp 4797-4800 (1961), thereby incorporated by reference. In accordance with these procedures, polyorganotin halides are reacted with allyl or propargyl halides in the presence of magnesium metal to produce the desired allyl or propargyl derivatives. Alternatively, the polyorganotin halides can be allowed to react with preformed allyl or propargyl magnesium halides. When a propargyl magnesium halide is used, the resulting product is generally mixture of the propargyl and allenyl isomers.

The present organotin curing agents can be incorporated into the fluoroelastomer using conventional compounding techniques. The fluoroelastomer can also include the fillers, reinforcing agents, stabilizers, plasticizers, lubricants or processing aids typically used with elastomer compositions of this type. Carbon black is often added to such elastomeric compositions, acting as a filler, reinforcer, light screen and antioxidant. Another useful ingredient in formulations of the present invention is a cyclic polyether ("Crown") compound which reduces viscosity and improves processability, such as those described in C. J. Pederson, *J. Am. Chem. Soc.* Vol. 89, p 7017 (1967).

The polymer and curing agent, together with other components of the fluoroelastomer composition, are mixed together by any convenient means, usually on a two-roll mill at a temperature of from about 40° to 100° C. The mixed composition is shaped and cured or vulcanized by pressing it into a mold and heating at elevated temperatures. In general, the present compositions can be cured at temperatures lower than those considered necessary with curing agents previously used in the art. The optimum curing temperature will vary with the particular organotin compound used. In general, the present compositions can be effectively press cured at temperatures of about from 75° to 250° C. However, compositions containing the tetraallyltin and tetrapropargyltin compounds can be press cured at even lower temperatures, for example, as low as 25° C. The curing times at the higher temperatures which can be used are about from 5 to 30 minutes for a satisfactory press cure of a typical shaped article. Longer curing times, up to several days, may be necessary for adequate cure at the lower temperatures.

In general, to attain the maximum physical properties in the cured elastomer, the elastomeric compositions, after press curing, are post-cured according to conventional techniques. Post-curing generally involves maintaining the press cured part at elevated temperatures under nitrogen for a period of several hours.

The compositions of the present invention provide excellent cured or vulcanized fluoroelastomer compositions which can be cured more rapidly and at lower temperatures than previous compositions containing curing agents such as tetraphenyltin. The present compositions also generally attain a more complete state of cure during the conventional press curing operation. Moreover, the cured compositions resulting from the present invention exhibit a surprising stability in a wide variety of environments, including unusual resistance to degradation by water often found in chemical processing and oil well operations. The compositions of the present invention provide outstanding cure performance when used in conjunction with fluoroelastomers containing secondary cure sites as exemplified by Nottke U.S. Pat. No. 3,933,767. The curing of this type of elastomer has previously been unsatisfactory using the tetraphenyltin compositions previously known in the art.

The present invention is further illustrated by the following specific examples, in which parts and percentages are by weight unless otherwise indicated.

In these Examples the perfluoroelastomer used was a terpolymer of tetrafluoroethylene, perfluoro(methylvinyl ether) and perfluoro(8-cyano-5-methyl-3,6-dioxa-1-octene) prepared according to the procedures described in Breazeale, U.S. Pat. No. 4,281,092. The polymers contained 30 to 32 mole percent of the perfluoro(methylvinyl ether) and about 0.6 to 0.8 mole percent of the cyano monomer. The polymers exhibited inherent viscosities ranging from 0.6 to 0.8 dl/g as measured in a solution containing 0.2 grams of polymer per 100 ml of solvent consisting of a 60/40/3 volume ratio of heptafluoro-2,3,3-trichlorobutane, perfluoro(butyltetrafluorohydrofuran) and ethylene glycol dimethylether.

EXAMPLE 1 AND COMPARATIVE EXAMPLE A

Perfluoroelastomer was compounded on a two-roll rubber mill at 60° C. with curing agent, carbon black and 18-crown-6 cyclic polyether (1, 4, 7, 10, 13, 16-hexaoxacylooctadecane) to reduce viscosity and improve processability.

The degree of crosslinking was measured in a Monsanto Oscillating Disc Rheometer at 190° C. Test results are shown in Table I, and indicate that the present allyltin curing agents are significantly more active than tetraphenyltin, as shown by the higher delta torque values of the ODR measurements.

The compounded fluoroelastomers were pressed, cured and post cured under the conditions reported in the table, and subsequently tested for physical properties. The results are reported in Table I, and indicate that the compositions of the present invention are significantly more resistant to exposure to hot water.

TABLE I

| | Example | |
|---|---|---|
| | 1 | A |
| Terpolymer | 100 | 100 |

TABLE I-continued

| | Example | |
|---|---|---|
| | 1 | A |
| Allyltriphenyltin | 2.8 | — |
| Tetraphenyltin | — | 3.0 |
| 18-Crown-6 | 0.3 | 0.3 |
| SAF Black | 8 | 8 |
| Minimum Torque (kg cm) | 19.8 | 16.8 |
| Tq 30 min. (kg cm) | 25.7 | 6.9 |
| Tq 60 min. (kg cm) | 29.2 | 14.7 |
| Tq 60 min. (kg cm) | 49.0 | 31.5 |
| Press Cured | | |
| Time (min)/Temp. °C. | 30/210 | 30/210 |
| Post Cured (under nitrogen) | | |
| Time (hr)/Temp. °C. | 6/90 | 6/90 |
| | 10/90 to 305 | 10/90 to 316 |
| | 26/305 | 27/316 |
| Properties | | |
| Tensile Test | | |
| (ASTM-D412 - Method A, Small dumbbells) | | |
| Stress at 100% Elong, MPa | 4.2 | 3.2 |
| Stress at break, MPa | 14.8 | 13.5 |
| Elongation at break, % | 180 | 180 |
| Compression Set | | |
| (70 hr/204° C., ASTM D395, Yerzley Pellets) | | |
| % | 24 | 21 |
| Water Resistance | | |
| (Three days liquid water at 232 ± 5° C.) | | |
| Appearance | Intact | Swollen |
| Volume Swell, Vol. % | 2 | 24[1] |

[1]Measured on a similar compound but with 12 phr SAF carbon black.

EXAMPLES 2-4 AND CONTROL EXAMPLE B

The general procedure of Example 1 was repeated except that a white compound based on titanium oxide was prepared instead of a black compound. The compositions were tested as before and the results reported in Table II.

If these compositions were tested as with Example 1 and Comparative Example A, the compositions of the present invention would present a similar superiority in resistance to hot water.

TABLE II

| | Example | | | |
|---|---|---|---|---|
| | B | 2 | 3 | 4 |
| Terpolymer | 100 | 100 | 100 | 100 |
| Diallyldibutyltin | — | 3.0 | 2.0 | 2.0 |
| Tetraphenyltin | 4.0 | — | 2.0 | 2.0 |
| 18-Crown-6 | — | — | 0.2 | 0.2 |
| Sulfolane | 0.6 | 0.6 | — | — |
| TiO$_2$ | 20 | 20 | 20 | — |
| Silica | — | — | — | 9 |
| ODR | | | | |
| (190° C., Monsanto Oscillating Disc Rheometer) | | | | |
| Minimum Torque (kg cm) | 18.7 | 12.6 | 10.7 | 20.2 |
| Tq 30 min. (kg cm) | 2.4 | 16.8 | 10.1 | 19.2 |
| Tq 60 min. (kg cm) | 5.7 | 17.9 | 14.3 | 19.3 |
| Tq 60 min. (kg cm) | 24.4 | 30.5 | 25.0 | 39.5 |
| Press Cured | | | | |
| Time (min)/Temp. °C. | 30/210 | 30/210 | 30/210 | 30/210 |
| Post Cured (under nitrogen) | | | | |
| Time (hr)/Temp. °C. | 6/25 to 204 | | | |
| | 18/204 | | | |
| | 6/204 to 288 | | | |
| | 18/288 | | | |
| Properties | | | | |
| Tensile Test | | | | |
| (ASTM-D412 - Method A, Small dumbbells, 25° C.) | | | | |
| Stress at 100% Elong, MPa | 2.9 | 2.7 | 2.5 | 4.2 |
| Stress at break, MPa | 10.2 | 11.3 | 7.5 | 8.4 |
| Elongation at break, % | 170 | 210 | 190 | 170 |
| Compression Set | | | | |
| (70 hr/204° C., ASTM D395, #214 O-rings) | | | | |

TABLE II-continued

| | Example | | | |
|---|---|---|---|---|
| | B | 2 | 3 | 4 |
| % | 65 | 46 | 49 | 60 |

EXAMPLE 5

A semi-solid terpolymer was prepared from 97.1% hexafluoropropylene oxide, 2% perfluoro(6,7-epoxy-4-oxaheptane nitrile), and 0.9% perfluoro(1,2-epoxy-10,11-epoxy-4,8-dioxaundecane). A mixture of 13.7 g of this polymer and 0.22 ml tetrallyltin was stirred briefly under nitrogen at room temperature and then transferred to a slab micromold which was pressed at 172 MPa. After three days at room temperature the well-formed slab was demolded, then post cured under nitrogen at 120° C. overnight. A dumbbell cut from the resulting soft, resilient elastomeric slab was tested and had the following tensile properties:

Stress at 100% Elong., MPa: 0.34
Stress at 200% Elong., MPa: 0.55
Stress at Break, MPa: 0.79
Elongation at Break, MPa: 280%

EXAMPLE 6

The general procedure of Example 1 was repeated, except that the curing agent used was a mixture of allenyl- and propargyl- triphenyltin. The curing agent was prepared according to the procedures described in M. L. Quan & P. Cadiot, *Bull. Soc. Chim. Fr.* 1965, pp 45–7.

The compounded fluoroelastomer was pressed, cured, post cured and tested as in Example 1, and the results are reported in Table III.

TABLE III

| | Example 6 |
|---|---|
| Terpolymer | 100 |
| Allenyl- and Propargyl- triphenyltin | 5.0 |
| 18-Crown-6 | 0.30 |
| SAF Black | 12 |
| Minimum Torque (kg cm) | 18.0 |

TABLE III-continued

| | Example 6 |
|---|---|
| Tq 30 min. (kg cm) | 23.4 |
| Tq 60 min. (kg cm) | 28.0 |
| Tq 60 min. (kg cm) | 46.0 |
| Press Cured | |
| Time (min)/Temp. °C. | 30/210 |
| Post Cured (under nitrogen) | |
| Time (hr)/Temp. °C. | 6/90 |
| | 10/90 to 305 |
| | 26/305 |
| Properties | |
| Tensile Test | |
| (ASTM-D412 - Method A, Small dumbbells) | |
| Stress at 100% Elong, MPa | 13.1 |
| Stress at break, MPa | 14.6 |
| Elongation at break, % | 110 |
| Compression Set | |
| (70 hr/204° C., ASTM D395, Yerzley Pellets) | |
| % | 30 |

I claim:

1. In a nitrile-substituted fluoroelastomer composition containing a curing agent, the improvement wherein the curing agent comprises about from 1 to 10 parts per 100 parts by weight of elastomer of an organotin compound having the general formula $R_xSnY_{4-x}$ wherein x is 0–3, R is aryl of 6–10 carbon atoms or alkyl of 1–4 carbon atoms, and Y is at least one of allyl, propargyl, and allenyl.

2. A fluoroelastomer composition of claim 1 wherein x is 3.

3. A fluoroelastomer composition of claim 2 wherein R is aryl.

4. A fluoroelastomer composition of claim 3 wherein R is phenyl.

5. A fluoroelastomer composition of claim 1 wherein the fluoroelastomer is a terpolymer of tetrafluoroethylene, perfluoromethyl perfluorovinylether and a cyano-substituted perfluorovinyl ether.

6. A fluoroelastomer composition of claim 1 wherein the curing agent comprises about from 3 to 5 parts per 100 parts of fluoroelastomer.

7. A fluoroelastomer composition of claim 1 wherein Y is allyl.

* * * * *